: US 10,175,463 B1
(45) Date of Patent: Jan. 8, 2019

(54) MULTIPLE AFOCAL ADAPTOR FOR MOBILE DEVICES

(71) Applicant: Leo Volfson, San Diego, CA (US)

(72) Inventor: Leo Volfson, San Diego, CA (US)

(73) Assignee: Torrey Pines Logic, Inc., San Diego, CA (US)

(*) Notice: Subject to any disclaimer, the term of this patent is extended or adjusted under 35 U.S.C. 154(b) by 277 days.

(21) Appl. No.: 14/599,360

(22) Filed: Jan. 16, 2015

Related U.S. Application Data

(60) Provisional application No. 61/928,711, filed on Jan. 17, 2014.

(51) Int. Cl.
    G02B 23/12 (2006.01)
    G02B 13/14 (2006.01)
    G02B 23/18 (2006.01)
    G02B 23/02 (2006.01)
    G02B 13/16 (2006.01)

(52) U.S. Cl.
    CPC ............ *G02B 13/14* (2013.01); *G02B 13/16* (2013.01); *G02B 23/02* (2013.01); *G02B 23/18* (2013.01)

(58) Field of Classification Search
    CPC ............ H04N 5/2254; H04N 21/4223; H04N 5/2252; H04N 5/2257; H04N 5/23209; G02B 15/10; G02B 23/12; G02B 13/001; G02B 13/16; G03B 17/565; G03B 17/48; G03B 17/566; H04M 2250/52; H04M 1/0254; Y10T 29/49826
    See application file for complete search history.

(56) References Cited

U.S. PATENT DOCUMENTS

| | | | | |
|---|---|---|---|---|
| 2,024,322 A | * | 12/1935 | Wittig | G02B 7/002 2/426 |
| 3,454,323 A | * | 7/1969 | Dierks | G03B 17/14 359/612 |
| 4,166,953 A | * | 9/1979 | Menke | G02B 23/12 250/333 |
| 4,249,797 A | * | 2/1981 | Sendecki | G02B 23/04 359/629 |
| 4,264,167 A | * | 4/1981 | Plummer | G03B 29/00 396/17 |

(Continued)

*Primary Examiner* — Bumsuk Won
*Assistant Examiner* — Balram Parbadia
(74) *Attorney, Agent, or Firm* — Fish & Richardson P.C.

(57) ABSTRACT

In some aspects, an afocal adaptor for an optical device comprises a housing. The housing includes a first and a second optical channel. A divider is configured between the first optical channel and the second optical channel to prevent transmission of electromagnetic radiation between the first optical channel and the second optical channel. At least one lens is associated with each of the first optical channel and the second optical channel. A particular at least one lens is configured to provide a focal point for each of the first optical channel and the second optical channel and to guide a particular type of electromagnetic radiation through each of the first optical channel and the second optical channel. The electromagnetic radiation is guided into a corresponding first receiving optical channel and a second receiving optical channel associated with the optical device. A coupling mechanism is attached to the housing and configured to permit attachment of the housing to the optical device.

20 Claims, 5 Drawing Sheets

(56) References Cited

U.S. PATENT DOCUMENTS

| | | | | |
|---|---|---|---|---|
| 4,407,009 A * | 9/1983 | Adamson, Jr. | H04N 5/2254 | 250/299 |
| 4,834,525 A * | 5/1989 | Vansaghi | G02B 7/002 | 351/158 |
| 5,204,774 A * | 4/1993 | Owen, Jr. | G02B 13/16 | 250/214 VT |
| 5,455,711 A * | 10/1995 | Palmer | G02B 7/14 | 359/353 |
| 5,499,064 A * | 3/1996 | Vansaghi | G02C 7/088 | 351/158 |
| 6,737,331 B1 * | 5/2004 | Lewis | B82Y 35/00 | 136/201 |
| 7,604,423 B2 * | 10/2009 | Nagata | G03B 19/07 | 348/375 |
| D626,950 S * | 11/2010 | Roman | D14/240 | |
| 8,073,324 B2 * | 12/2011 | Tsai | H01F 7/0247 | 359/827 |
| 8,593,745 B2 * | 11/2013 | O'Neill | G02B 7/14 | 359/827 |
| 9,294,660 B2 * | 3/2016 | O'Neill | H04N 5/2254 | |
| D757,701 S * | 5/2016 | Mao | D14/250 | |
| D760,210 S * | 6/2016 | Mao | D14/250 | |
| D760,211 S * | 6/2016 | Mao | D14/250 | |
| D760,212 S * | 6/2016 | Mao | D14/250 | |
| 2004/0156049 A1 * | 8/2004 | Breninger | G01J 1/02 | 356/364 |
| 2004/0256558 A1 * | 12/2004 | Kuerbitz | G02B 13/14 | 250/330 |
| 2005/0068444 A1 * | 3/2005 | Oshima | G02B 13/0035 | 348/335 |
| 2008/0089680 A1 * | 4/2008 | Nagata | G03B 19/07 | 396/529 |
| 2009/0163377 A1 * | 6/2009 | Alexandre | G01N 21/6428 | 506/9 |
| 2009/0181729 A1 * | 7/2009 | Griffin, Jr. | H04N 5/2254 | 455/575.1 |
| 2009/0268043 A1 * | 10/2009 | Olsen | H04N 5/3415 | 348/218.1 |
| 2010/0225429 A1 * | 9/2010 | Tsai | H01F 7/0247 | 335/219 |
| 2010/0328420 A1 * | 12/2010 | Roman | H04N 5/2251 | 348/14.08 |
| 2011/0261175 A1 * | 10/2011 | Fomitchov | A61B 5/0071 | 348/61 |
| 2012/0066887 A1 * | 3/2012 | Garris | G02B 23/12 | 29/525.01 |
| 2012/0157160 A1 * | 6/2012 | Ozcan | G01N 21/6458 | 455/556.1 |

* cited by examiner

MULTIPLE AFOCAL ADAPTOR FOR MOBILE DEVICES

This Application claims priority under 35 U.S.C. § 119(e) to U.S. Provisional Patent Application Ser. No. 61/928,711, filed on Jan. 17, 2014. The entire contents of U.S. Provisional Patent Application Ser. No. 61/61/928,711 is hereby incorporated by reference.

BACKGROUND

Changing optical characteristics associated with received image data when using an existing optical device (e.g., a thermal camera) is often desired by users of optical devices, but typically difficult and/or expensive to accomplish. For example, changing field-of-view, magnification, and/or otherwise influencing received electromagnetic radiation (e.g., infrared and optical wavelength light used in a thermal imaging solution with both optical and thermal image sensors) typically requires a custom optical solution, a computer processing solution, and/or a new optical device/components. Typically, optical adaptors do not fit standard optical devices (e.g., mobile computing device cameras) and often require custom solutions. However, custom solutions can be very expensive, impractical for use with standard mobile computing devices, difficult to maintain, and can quickly become technologically obsolete with advancements in camera/optical technology.

DESCRIPTION OF DRAWINGS

Like reference numbers and designations in the various drawings indicate like elements.

DETAILED DESCRIPTION

The disclosure relates to a multiple afocal adaptor for mobile devices ("afocal adaptor"). The details of one or more implementations of the subject matter of this specification are set forth in the following description and the accompanying drawings to enable a person of ordinary skill in the art to practice the disclosed subject matter. Other features, aspects, and advantages of the subject matter will become apparent from the description, the drawings, and the claims.

An afocal system is formed by the combination of two optical focal systems. Described is an afocal adaptor for mobile devices that allows for magnification of received electromagnetic radiation simultaneously by two or more digital camera systems. For example, each digital camera may each have an input field-of-view of one-hundred thirty-five degrees, and the afocal adaptor may allow magnification levels of 2-, 3-, 4-, and/or 5-times of a received image for use by the optical focal system of each of the digital camera systems.

Changing optical characteristics associated with received image data when using an existing optical device (e.g., a thermal camera) is often desired by users of optical devices, but typically difficult and/or expensive to accomplish. For example, changing field-of-view, magnification, and/or otherwise influencing received electromagnetic radiation (e.g., infrared and optical wavelength light used in a thermal imaging solution with both optical and thermal image sensors) typically requires a custom optical solution, a computer processing solution, and/or a new optical device/components. Typically, optical adaptors do not fit standard optical devices (e.g., mobile computing device cameras) and often require custom solutions. However, custom solutions can be very expensive, impractical for use with standard mobile computing devices, difficult to maintain, and can quickly become technologically obsolete with advancements in camera/optical technology.

An afocal adaptor can be used to remedy the above-described concerns and may provide one or more of the following advantages. First, the afocal adaptor can allow quick and inexpensive changes to optical characteristics of received image data when using an existing optical device. For example, the afocal adaptor can permit changing field-of-view, magnification, and/or otherwise influencing received electromagnetic radiation (e.g., infrared and optical wavelength light used in a thermal imaging solution with both optical and thermal image sensors) with optical devices (e.g., mobile computing device cameras). Second, the afocal adaptor also allows changing the above-described optical characteristics without a custom optical solution, a computer processing solution, and/or a new optical device/expensive components. Third, users have the option to rapidly change the afocal adaptor to one with different optical/performance characteristics based on a needed use (e.g., a user needs to switch from a thermal magnification solution to a visible light high-magnification and narrow field-of-view solution). Afocal adaptors can be produced for many types of optical devices and in many different configurations and are inexpensive enough to either readily purchase, update, and/or replace if necessary based on a desired need, technological advancements, etc. Other advantages will be apparent to those skilled in the art.

Figure 1:
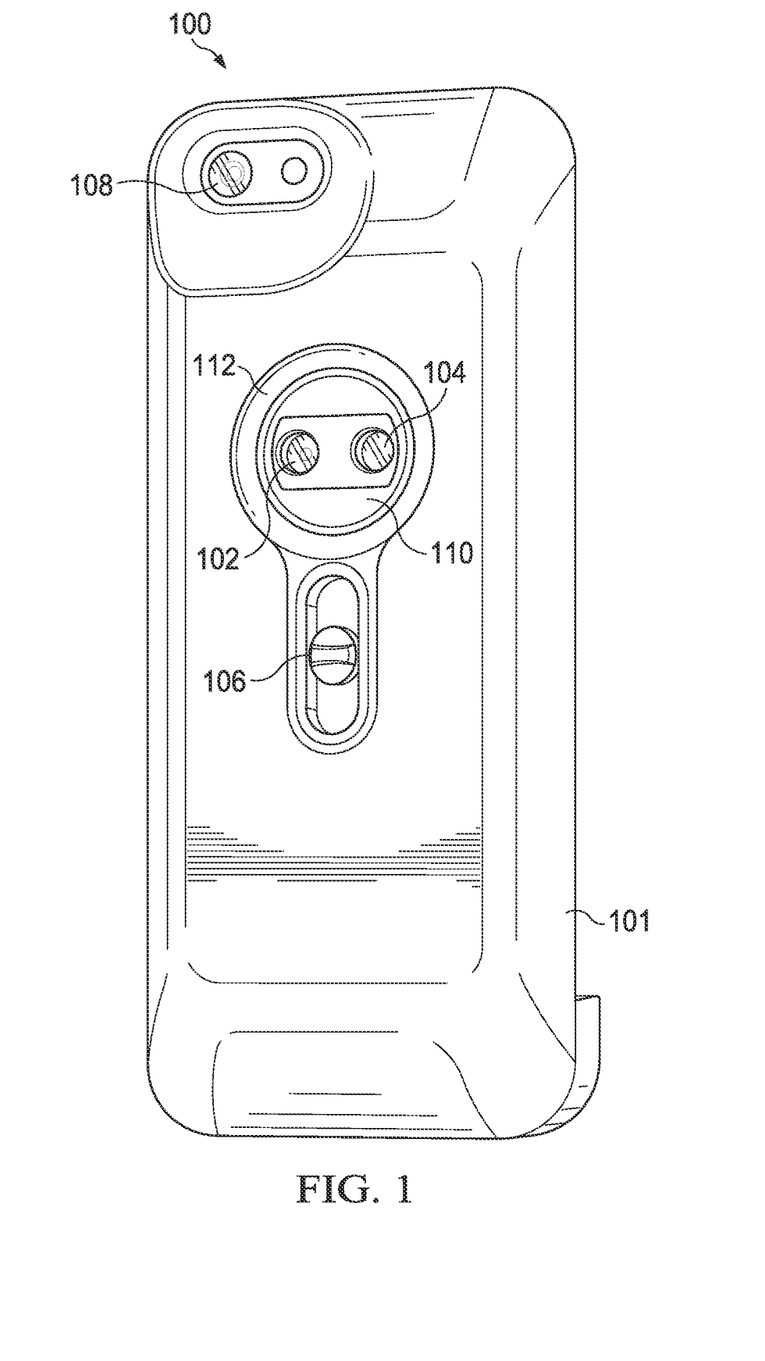
FIG. 1 is a perspective view of a thermal imaging adaptor for use with a mobile device.

FIG. 1 is a perspective view 100 of a thermal imaging adaptor 101 for use with a mobile device (note, the mobile device is situated underneath and at least partially covered by (at least on the adjacent surface to the thermal imaging adaptor 101) the pictured thermal imaging adaptor 101). As illustrated, the thermal imaging adaptor 101 provides two digital cameras (e.g., an optical camera 102 and a thermal imaging camera 104). In other implementations, more or fewer than two digital cameras can be provided. For example, an additional third digital camera can provide an additional optical camera 102 to provide realistic three-dimensional thermal images. Another example could include an additional low-light camera to provide low-light functionality. In some implementations, the thermal imaging adaptor 101 also provides an activation switch 106. In some implementations, the mobile device can also provide a digital camera 108 (here shown with a flash element).

The thermal imaging adaptor 101 can also be configured with an imager plate 110 and an imager ring 112. As illustrated, the imager plate 110 and the imager ring 112 have smooth, non-engagement surfaces, but in other implementations, the imager plate 110 and the imager ring 112 can singly or both be configured with various surfaces (e.g., an engagement surface such as notches, threads, holes, attachment points, etc.) to allow the attachment of devices (e.g., an afocal adaptor) over the optical camera 102 and the thermal imaging camera 104 of the thermal imaging adaptor 101.

Figure 2A:
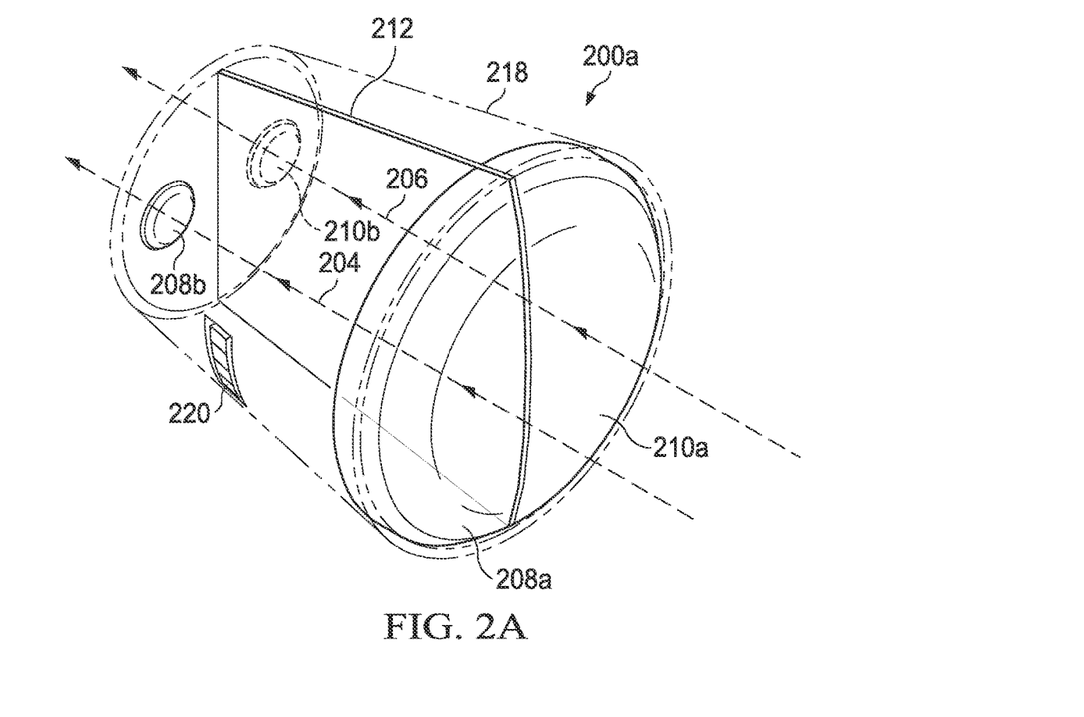
FIG. 2A is a transparent perspective view of a conically shaped multiple afocal adaptor for use with mobile devices ("afocal adaptor") according to an implementation for use with the thermal imaging adaptor of FIG. 1.

FIG. 2A is a transparent perspective view of a conically shaped afocal adaptor 200a according to an implementation for use with the thermal imaging adaptor of FIG. 1.

Figure 6:
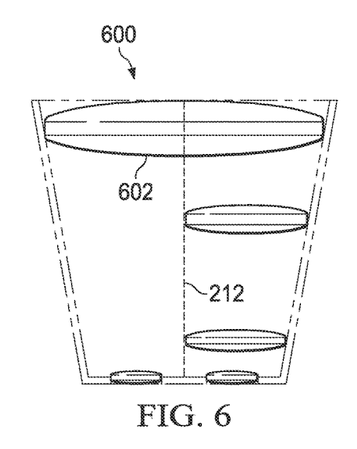
FIG. 6 is a side view of the afocal adaptor of FIG. 2A illustrating the use of multiple lenses per optical channel according to an implementation.

The illustrated afocal adaptor 200a has two optical channels 204 and 206, respectively. In some implementations, each optical channel 204/206 forms a separate mechanical/optical assembly (e.g., lenses, support structures, etc.). The optical channels 204/206 can be coupled together (e.g., by adhesives, mechanical means such as screws, clips, etc.) to form an assembly. Each optical channel typically has at least two lenses to provide magnification and/or functionality, but more or fewer than two lenses per optical channel is within the scope of this disclosure. For example, optical channel 204 has lenses 208a and 208b, and optical channel 206 has lenses 210a and 210b, but, in some implementations, each optical channel could contain three or more lenses. For the purposes of this disclosure, lenses 208a and 210a will be referred to as "upper" lenses, while lenses 208b and 210b will be referred to as "lower" lenses. FIG. 6 is a side view 600 of the afocal adaptor 200a of FIG. 2A illustrating the use of multiple lenses per optical channel according to an implementation. In some implementations, mechanisms (not illustrated—e.g., a worm drive, etc.) can be configured within each optical channel to move one or more lenses in relation to each other along or perpendicular to the optical channel formed by the lenses (e.g., to provide magnification and focus/alignment functionality). Each optical channel can, in some implementations, contain different numbers of lenses when compared to each other. Also note that FIG. 6 illustrates the use of a single upper lens 602 as opposed to two or more coupled lenses such as 208a and 210a (described in more detail below).

Figure 7:
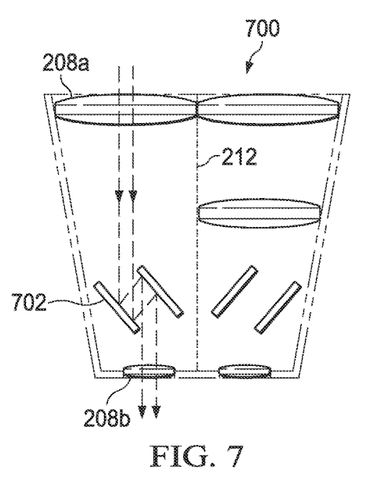
FIG. 7 is a side view of the afocal adaptor of FIG. 2A using a mirror assembly to guide electromagnetic radiation within an optical channel according to an implementation.

Referring to FIG. 7, FIG. 7 is a side view 700 of the afocal adaptor 200a of FIG. 2A using a mirror assembly 702 to guide electromagnetic radiation within an optical channel according to an implementation. In some implementations, additional and/or different structures/assemblies can be used to guide received electromagnetic radiation within an optical channel (here, from lens 208a to lens 208b). In the case of mirror assembly 702, the mirror assembly 702 allows for larger diameter "upper" lens(es) (e.g., lens 208a) to be used to increase magnification but to keep an afocal adaptor housing 218 shorter in the direction of the optical channel.

Each optical channel is distinct and separated by a divider 212 to prevent electromagnetic radiation from "bleeding"/transmitting into the other optical channel and causing interference (e.g., optical vs. infrared). In some implementations, the divider 212 can be coupled between the two or more mechanical/optical assemblies. For example, the divider 212 can be a strip of an opaque substance such as plastic, metal, etc. At least a portion of the divider 212 can also be integrally molded into the afocal adaptor housing 218 to provide a physical division between each mechanical/optical assembly. In some implementations, the divider 212 also extends between the lenses to prevent electromagnetic radiation from transmitting through the edge of a lens into a different optical channel.

Optical channels are typically oriented vertically at a ninety degree angle and are spaced to align with the spacing of the center of receiving digital camera apertures. For example, optical channels 204 and 206 would be oriented at ninety degrees and spaced to align with apertures of optical camera 102 and thermal imaging camera 104, respectively. In other implementations, optical channels can be at some other angle and spacing and use mirrors (see, e.g., FIG. 7) or other structures to guide electromagnetic radiation into the apertures of receiving digital camera at the proper angle and spacing.

Each set of lenses associated with a distinct optical channel is configured to transmit and/or influence/modify a particular type of electromagnetic radiation before receipt by a digital camera associated with the thermal imaging adaptor 101 of FIG. 1. For example, lenses 208a and 208b can be configured of glass, plastic, etc. that is transparent to optical wavelengths of electromagnetic radiation (such as those used in a mobile device digital camera used to take standard digital photographs). Lenses 210a and 210b, however, can be configured to be transparent to infrared (IR) radiation such as in thermal imaging systems. In some implementations, lenses 210a and 210b can be configured of Germanium (Ge), quartz, AMTIER, barium fluoride, calcium fluoride, sodium chloride, CLEARTRAN, fused silica, silicon, polyethylene, IR transparent ceramics, and/or any other type of substance transparent to infrared electromagnetic radiation.

In some implementations, the lenses can be made of the same substance (or, as shown in FIG. 6, a single lens can be used) as long as transparent to both optical and IR radiation wavelengths, e.g., quartz, polyethylene, etc. In some implementations, corresponding lenses (e.g., 208a and 210a) for each of the two optical channels may be configured as two (or more) lenses from a single unit of a substance to provide electromagnetic radiation transmission to their respective optical channels (e.g., 204 and 206).

In some implementations, a single lens (e.g., refer to FIG. 6) can be used to channel electromagnetic radiation within two (or more) optical channels (e.g., to the two digital cameras associated with the thermal imaging adaptor 101). For example, if the thermal imaging adaptor 101 was configured with an additional camera added to provide low-light functionality, the single lens can be used to channel electromagnetic radiation to the three optical channels for reception by respective digital cameras.

The lenses associated with each optical channel provide a focal point for the optical channel. In some implementations, the focal point for all optical channels are the same (e.g., focused at 50 feet beyond the upper lens of the afocal adaptor). In other implementations, one or more optical channels can have varying focal points in relation to each other (e.g., one optical channel focused at 50 feet and one optical path focused at 75 feet).

Figure 2B:
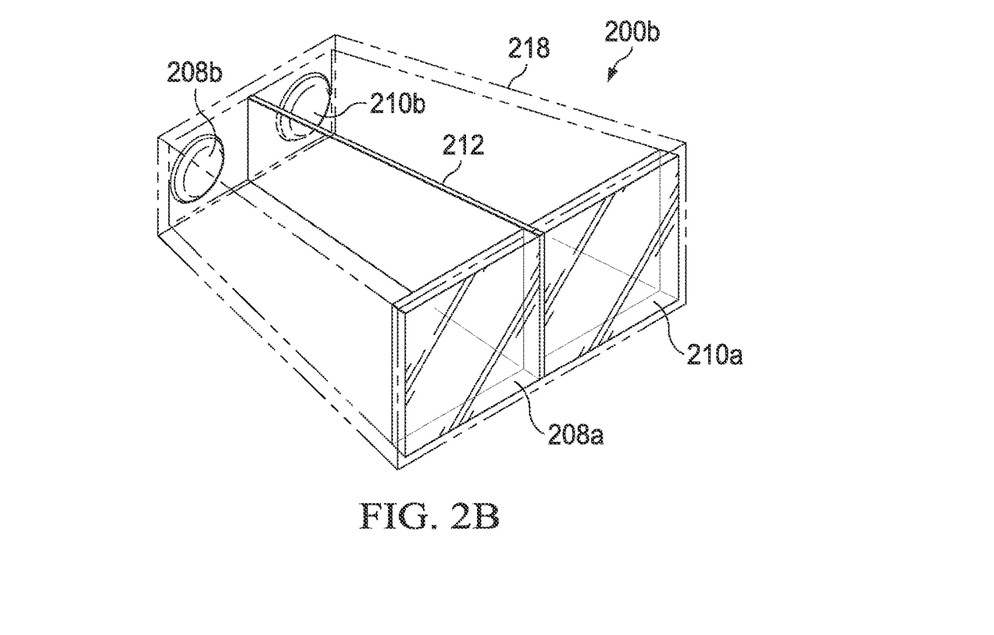
FIG. 2B is a transparent perspective view of a rectangular-shaped afocal adaptor according to an implementation for use with the thermal imaging adaptor of FIG. 1.

In the illustrated afocal adaptors 200a and 200b, the lenses are coupled together. For example, the lenses can be coupled with adhesive, etc. as part of separate optical channel assemblies. In the case of FIG. 2A, lenses (e.g., 208a and 210a) have been scalloped along an edge and coupled to fit within the conically shaped afocal adaptor housing. FIG. 2B is a transparent perspective view of a rectangular-shaped afocal adaptor according to an implementation for use with the thermal imaging adaptor of FIG. 1. In the case of FIG. 2B, the lenses (e.g., 208a and 210a) have been scalloped to form a rectangular shape to fit within the rectangular-shaped afocal adaptor housing 218. In other implementations, lenses can be scalloped in more complex shapes (e.g., a "crescent moon" or other shape) to fit within whatever shape the afocal adaptor housing takes or for a particular purpose.

In some implementations, the upper and lower lenses of the afocal adaptor 200a create a hermitic seal for each mechanical/optical assembly when installed into the afocal adaptor housing 218. For example, the assembly with lenses 210a/b may be purged with nitrogen or other type of gas to prevent water vapor from interfering with IR transmission through the assembly to the thermal imaging camera 104 of the thermal imaging adaptor 101.

Although not illustrated, the afocal adaptor housing 218 can be configured with various coupling structures/mechanisms (e.g., threads, notches, holes, etc.) to permit coupling the afocal adaptor 200a to the thermal imaging adaptor. In most implementations, the coupling structures will be located in the region of the housing 218 near the lower lenses at the "bottom" of the afocal adaptor. In the case of FIG. 2B, an additional housing can be attached around the lower rectangular portion of the afocal adaptor housing 218 to allow a seamless and aesthetic coupling with the circular-shaped portion of the thermal imaging adaptor 101 (imager plate 110 and imager ring 112). For example, the coupling structure could be a locking-type surface that is inserted into a corresponding mating-type surface and slid/twisted into place to lock the afocal adaptor 200a against the thermal imaging adaptor 101.

The afocal adaptor 200a can, in some implementations, also have a magnification/focal adjustment mechanism 220. The mechanism 220 is illustrated as a switch-type mechanism, but could also include a wheel, lever, button, twist-type assembly, or other mechanism 220. The mechanism 220 allows the afocal adaptor 200a to increase/decrease magnification to the thermal imaging adaptor 101, focus the received electromagnetic radiation, etc.

As will be appreciated by those of ordinary skill in the art, the illustrated afocal adaptors 200a and 200b are for illustration only and can contain additional supporting structures, mechanisms, etc. consistent with this disclosure that are not illustrated (e.g., lens mounting rings, adjustment mechanisms, etc.) For example, a worm drive could be used within an optical channel to allow to move a lens situated between lenses 208a and 210a along the optical axis between lenses 208a and 210a to vary magnification. As another example, the afocal adaptor can have a mechanism providing for a multiple part afocal adaptor housing 218 and allowing for a twist of the afocal adaptor housing 218 to vary a magnification between a first magnification value and a second magnification value (e.g., 2× and 4×). The afocal adaptor can also have various other configurations, shapes, etc. that are consistent with this disclosure. For example, FIG. 2B is a transparent perspective view of a rectangular-shaped afocal adaptor 200b according to an implementation for use with the thermal imaging adaptor of FIG. 1. In the illustrated afocal adaptor 200b, the lenses can be, for example, scalloped to provide the necessary shape to fit within the afocal adaptor housing 218.

Figure 3:
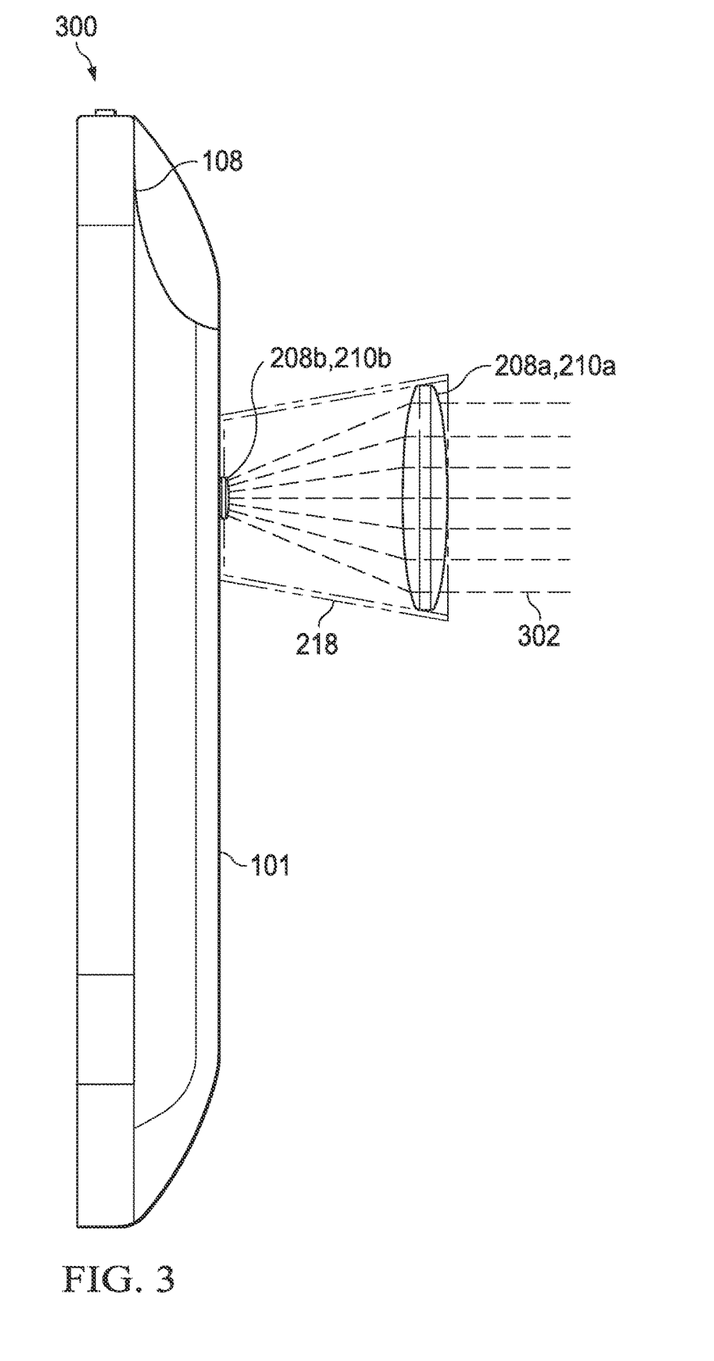
FIG. 3 is a transparent side view of the afocal adaptor of FIG. 2A coupled to the thermal imaging adaptor of FIG. 1 and illustrating one set of afocal lenses according to an implementation.

FIG. 3 is a transparent side view 300 of the afocal adaptor 200a of FIG. 2 coupled to the thermal imaging adaptor 101 of FIG. 1 and illustrating one set of afocal lenses (e.g., 208a/210a or 208b/210b) according to an implementation.

As illustrated, afocal adaptor 200a is coupled with the thermal imaging adaptor 101 of FIG. 1.

Received electromagnetic radiation 302 is channeled by the lenses 208a/b and/or 210a/b, respectively, into corresponding cameras (e.g., optical camera 102 and thermal imaging camera 104). Note that the lenses and simulated electromagnetic radiation 302 (and other similar examples within this disclosure) are for illustrative purposes only and not intended to illustrate actual behavior of any particular type of lens and/or lens assembly and/or actual behavior of electromagnetic radiation.

Although not illustrated, the afocal adaptor 200a can be coupled to the thermal imaging adaptor 101 in different ways. For example, the imager plate 110 can be made of a magnetically attractive material (e.g., iron, steel, and/or other ferromagnetic/paramagnetic materials, etc.) and the afocal adaptor housing 218 can be configured with a magnet to secure the afocal adaptor 200a to the thermal imaging adaptor 101 (or vice versa). In some configurations, the afocal adaptor 200a can be configured with threads, clips, screws, etc. to allow it to be coupled with the thermal imaging adaptor 101. For example, the imager ring 112 can be threaded to engage with threads and/or other structures configured into the afocal adaptor housing 218.

In other implementations, a mounting ring (not illustrated) can be adhered (e.g., with adhesive, tape, weld, screws, clips, etc.) to the imager plate 110 and/or imager ring 112 to provide a mounting structure for the afocal adaptor. For example, the mounting ring can be configured with threads and/or a twist-to-lock/unlock type of structure to allow the afocal adaptor to be screwed into place and locked/unlocked in a correct orientation with the thermal imaging adaptor 101 digital cameras. Other mounting solutions are also possible. For example, a clip-type assembly could be used to couple a mounting ring to the imager plate 110/imager ring 112 where the clips attach to the sides/edges of the thermal imaging adaptor 101 to provide a secure mounting point for the afocal adaptor as described above. In some implementations, the afocal adaptor could be configured with mounting clips to attach the afocal adaptor to the sides/edges of the thermal imaging adaptor 101. As will be appreciated by those of ordinary skill in the art, other various coupling mechanisms consistent with this disclosure to couple the afocal adaptor and the thermal imaging adaptor 101 are possible and are considered to be within the scope of this disclosure. The illustrations are not meant to limit the afocal adaptor in any way and also apply to afocal adaptor 200b of FIG. 2B (or any other afocal adaptor consistent with this disclosure).

Figure 4:
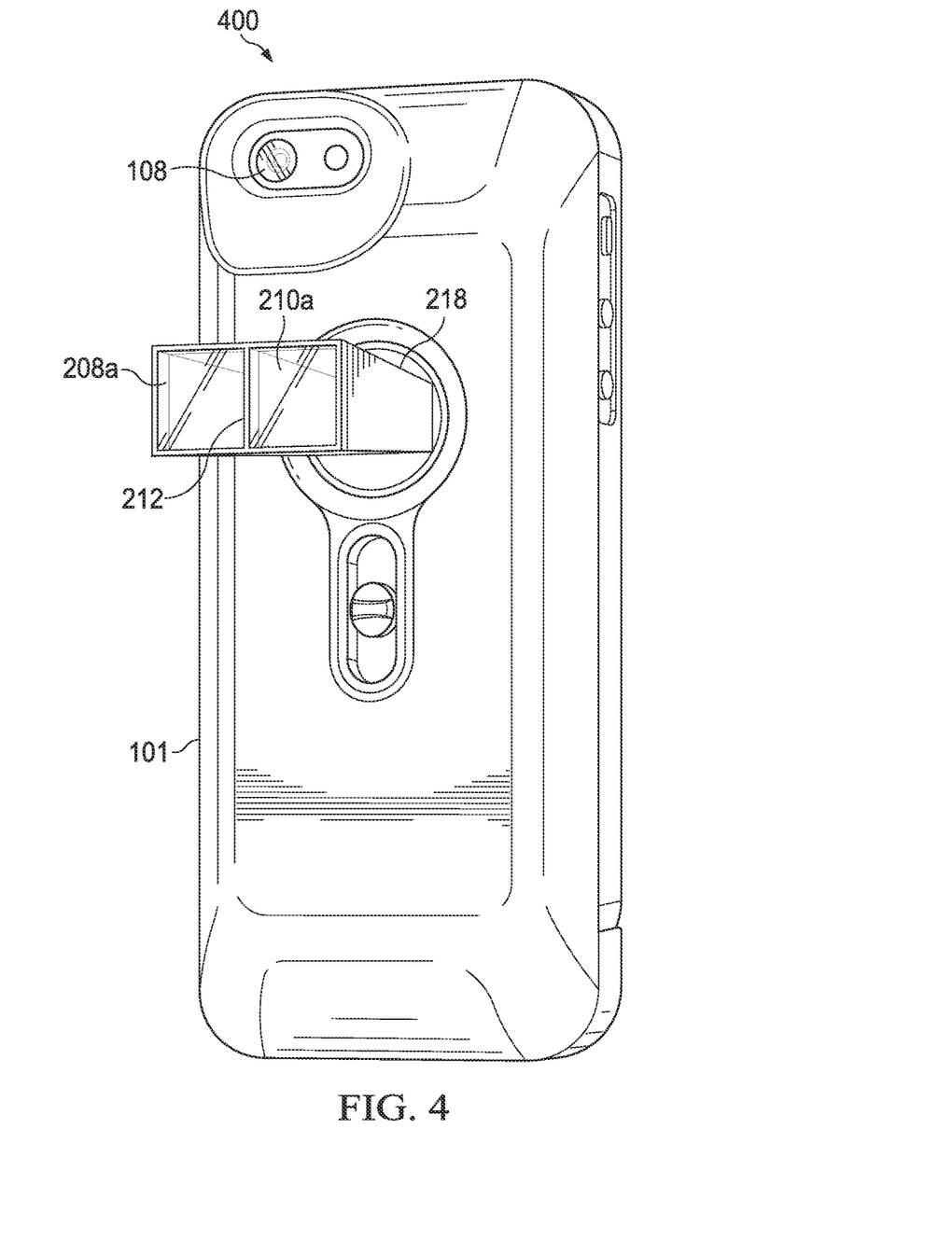
FIG. 4 is a perspective view of the afocal adaptor of FIG. 2B coupled to the thermal imaging adaptor of FIG. 1.

FIG. 4 is a perspective view 400 of the afocal adaptor 200b of FIG. 2B coupled to the thermal imaging adaptor 101 of FIG. 1. As illustrated, the afocal adaptor covers the thermal imaging adaptor 101 digital cameras to provide magnification, etc. for incoming electromagnetic radiation through lenses 208a and 210a and the corresponding optical channels 204 and 206, respectively.

In some implementations, one or more optical channels (e.g., 204/206) can be disabled simultaneously or individually. For example, an afocal adaptor can be configured with a switch, lever, button, etc. (for each optical channel or for the afocal adaptor as a whole) that can be used to occlude one or more optical channels (e.g., 204/206). An example may be to allow the optical camera 102 to take a photograph while the thermal imaging adaptor is operating while blocking any electromagnetic radiation associated with the thermal imaging camera 104.

Figure 5A:
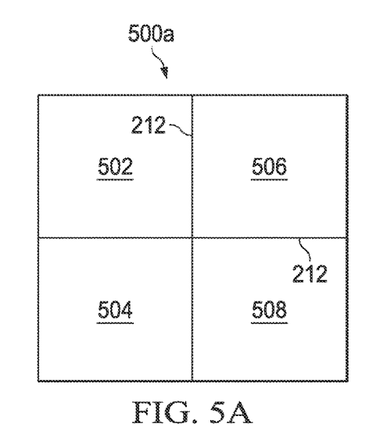
FIG. 5A is a top view of a quad afocal adaptor according to an implementation.

FIG. 5A is a top view of a quad afocal adaptor 500a according to an implementation. In the view 500a, four lenses 502, 504, 506, and 508 are coupled together and can serve as a group as either upper or lower lenses. As described above, each lens is scalloped into a square/rectangular shape and then coupled together as part of a separate optical channel assembly.

Figure 5B:
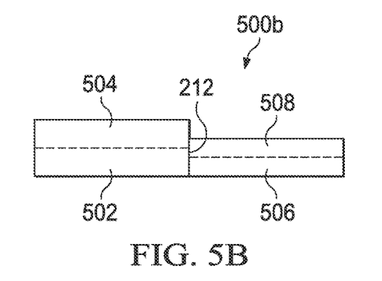
FIG. 5B is a side view of the lens assembly of the quad afocal adaptor of FIG. 5A according to an implementation.

FIG. 5B is a side view of the lens assembly 500b of the quad afocal adaptor 500a of FIG. 5A according to an implementation (looking through the side of lenses 504 and 508). Note that each lens can be of a different thickness depending upon the type of material, magnification needed, etc. In other implementations, the upper surfaces of the lenses can be aligned while the bottom surfaces are of a staggered appearance to provide a smooth outer appearance and to allow for ease of cleaning, less reflectivity, etc.

The foregoing description is provided in the context of one or more particular implementations. Various modifications, alterations, and permutations of the disclosed implementations can be made without departing from the scope of the disclosure. For example, although the foregoing afocal adaptor has been described in terms of attachment to the thermal imaging adaptor and mobile device illustrated in FIG. 1, as will be appreciated by those skilled in the art, the afocal adaptor can be adapted to attach to/be used with any other camera/optical system in a manner consistent with this disclosure. In addition, although the afocal adaptor has been illustrated in particular shapes/configurations, as will be appreciated by those skilled in the art, the afocal adaptor can be configured to be any shape/configuration consistent with this disclosure. Thus, the present disclosure is not intended to be limited only to the described and/or illustrated implementations, but is to be accorded the widest scope consistent with the principles and features disclosed herein.

What is claimed is:

1. An apparatus, comprising:
  a housing of an afocal adaptor, the housing including:
    an independent first and a second optical channel configured to influence and to channel a particular source of electromagnetic radiation into each of a first receiving optical channel and a second receiving optical channel, respectively, of an optical device of a mobile computing device, wherein each of the first receiving optical channel and the second receiving optical channel is associated with an independent digital imaging sensor;
    a divider configured between the first optical channel and the second optical channel to prevent commingling of electromagnetic radiation between the first optical channel and the second optical channel; and
    at least one lens associated with each of the first optical channel and the second optical channel, wherein the at least one lens is configured to independently influence the particular source of electromagnetic radiation with respect to both the first optical channel and the second optical channel and to guide the correspondingly influenced electromagnetic radiation through each of the first optical channel and the second optical channel and into the first receiving optical channel and the second receiving optical channel, respectively, of the optical device; and
    a coupling mechanism attached to the housing and configured to permit attachment of the housing to the optical device.

2. The apparatus of claim 1, wherein the optical device includes a visible light digital imaging sensor.

3. The apparatus of claim 2, wherein the optical device is a thermal digital imaging sensor.

4. The apparatus of claim 1, comprising an adjustment mechanism configured to permit adjustment of the at least one lens in relation to other lenses along or perpendicular to a particular optical channel.

5. The apparatus of claim 1, comprising a mirror assembly to guide the influenced electromagnetic radiation through a particular optical channel and into a particular receiving optical channel associated with the optical device.

6. The apparatus of claim 1, wherein the at least one lens is configured of a material belonging to the group consisting of Germanium (Ge), quartz, AMTIER, barium fluoride, calcium fluoride, sodium chloride, CLEARTRAN, fused silica, silicon, polyethylene, and IR transparent ceramics.

7. The apparatus of claim 1, comprising a hermetic seal in at least one of the first optical channel or the second optical channel.

8. The apparatus of claim 7, wherein at least one of the first optical channel or the second optical channel is nitrogen purged.

9. The apparatus of claim 1, wherein the coupling mechanism belongs to a group consisting of a magnet, a magnetically attractive material, threading, a clip, a screw, a locking-type surface, and an adhesive.

10. An afocal adaptor for use with an optical device, the afocal adaptor having an independent first optical channel and a second optical channel configured to influence and to channel a particular source of electromagnetic radiation into each of a first receiving optical channel and a second receiving optical channel, respectively, of the optical device of a mobile computing device, each of the first receiving optical channel and the second receiving optical channel associated with an independent digital imaging sensor, a coupling mechanism affixed to a housing permitting attachment of the housing to the optical device, the housing including a divider between the first optical channel and the second optical channel preventing commingling of electromagnetic radiation between the first optical channel and the second optical channel, at least one lens associated with each of the first optical channel and the second optical channel, wherein the at least one lens is configured to independently influence the particular source of electromagnetic radiation with respect to both the first optical channel and the second optical channel.

11. The afocal adaptor of claim 10 having an adjustment mechanism configured to permit adjustment of the at least one lens in relation to other lenses along or perpendicular to a particular optical channel.

12. The afocal adaptor of claim 11, wherein a particular at least one lens provides a focal point for each of the first optical channel and the second optical channel and guides a particular type of electromagnetic radiation through each of the first optical channel and the second optical channel.

13. A method, comprising:
  receiving a particular source of electromagnetic radiation with at least one lens associated with each of an independent first optical channel and a second optical channel, wherein each of the first optical channel and the second optical channel provides a channel for guiding influenced electromagnetic radiation into a first receiving optical channel and a second receiving optical channel, respectively, of an optical device of a mobile computing device, wherein each of the first receiving optical channel and the second receiving optical channel is associated with an independent digital imaging sensor;

independently influencing the received particular source of electromagnetic radiation using each of the at least one lenses for each of the first optical channel and the second optical channel;

independently guiding the influenced electromagnetic radiation into each of the first optical channel and the second optical channel using a corresponding at least one lens;

preventing commingling of the influenced electromagnetic radiation between the first optical channel and the second optical channel using a divider between the first optical channel and the second optical channel; and guiding the influenced electromagnetic radiation through each of the first optical channel and the second optical channel and into a corresponding first receiving optical channel and a second receiving optical channel of the optical device.

14. The method of claim 13, wherein influencing the received particular source of electromagnetic radiation includes blocking all but infrared (IR) electromagnetic radiation.

15. The method of claim 13, comprising using an adjustment mechanism to adjust at least one lens in relation to other lenses along or perpendicular to a particular optical channel.

16. The method of claim 13, comprising using a mirror assembly to guide the influenced electromagnetic radiation through a particular optical channel and into a particular receiving optical channel associated with the optical device.

17. The method of claim 13, wherein the at least one lens is configured of a material belonging to the group consisting of Germanium (Ge), quartz, AMTIER, barium fluoride, calcium fluoride, sodium chloride, CLEARTRAN, fused silica, silicon, polyethylene, and IR transparent ceramics.

18. The method of claim 13, comprising creating a hermetic seal in at least one of the first optical channel or the second optical channel.

19. The method of claim 13, comprising coupling the housing to the optical device.

20. The method of claim 13, wherein the coupling mechanism belongs to a group consisting of a magnet, a magnetically attractive material, threading, a clip, a screw, a locking-type surface, and an adhesive.

* * * * *

UNITED STATES PATENT AND TRADEMARK OFFICE
CERTIFICATE OF CORRECTION

PATENT NO. : 10,175,463 B1
APPLICATION NO. : 14/599360
DATED : January 8, 2019
INVENTOR(S) : Leo Volfson It is certified that error appears in the above-identified patent and that said Letters Patent is hereby corrected as shown below:

In the Specification

In Column 1, Line 7, delete "61/61/928,711" and Insert -- 61/928,711 --, therefor.

Signed and Sealed this
Fifth Day of March, 2019

Andrei Iancu
*Director of the United States Patent and Trademark Office*